Patented July 15, 1930

1,770,815

UNITED STATES PATENT OFFICE

HUGO SIEBENBÜRGER, OF BASEL, SWITZERLAND, ASSIGNOR TO THE FIRM: SOCIETY OF CHEMICAL INDUSTRY IN BASLE, OF BASEL, SWITZERLAND

VAT DYESTUFFS OF THE VIOLANTHRONE SERIES AND PROCESS OF MAKING SAME

No Drawing. Application filed July 21, 1925, Serial No. 45,095, and in Switzerland August 9, 1924.

It has been found that new black-dyeing vat dye-stuffs may be obtained from mono-aminoviolanthrone, i. e. the reduction product of the substance disclosed under No. 1102 in the Colour Index, edited by F. M. Rowe, published A. D. 1924 in Bradford, Yorkshire, Great Britain, by the Society of Dyers and Colourists, and also in the U. S. Patent specifications Nos. 796,393 and 876,679, by treating liquid suspensions of the latter with such oxidizing agents which may be employed in an acid medium, such as chromic acid, chlorate and sulfuric acid, etc.

It has been found, furthermore, that not only aminoviolanthrone but also its derivatives, as for instance those obtained by nitration and reduction of the dimethylviolanthrones described in the "Annalen der Chemie vol. 394, p. 146–148" show the same property. The dyestuffs thus obtained form dark powders, dissolving in concentrated sulfuric acid with bluish-red, in boiling nitrobenzene with blue to greenish-blue coloration and dyeing cotton fast olive-black to black tints which remain unchanged by treatment with chlorine.

The constitution of the new products is not known but it is very probable that the nuclear structure of the violanthrone skeleton

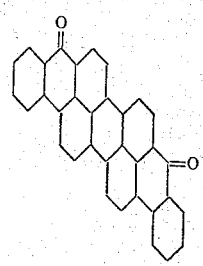

is not attacked.

Example 1

10 parts of mono-aminoviolanthrone cf. Colour Index No. 1102, and U. S. A. Patents 796,393 and 876,679 in finest state of subdivision are suspended in 100 parts of acetic acid of 80% strength and the suspension is heated to about 95° C. At this temperature there are added to the mixture by and by 500 parts of an aqueous solution of chromic acid corresponding with 2 per cent of $CrO_3$. When all the chromic acid solution has been added, the whole is kept at 95° C. for one hour, the dyestuff is then filtered, washed and dried. It forms a black powder, dissolving in sulfuric acid with dull bluish-red coloration. When poured into water, grayish-black flocks separate from the solution. The dyestuff dissolves in boiling nitrobenzene with slightly greenish-blue coloration and yields a dull blue vat, dyeing cotton olive-black tints which are fast to chlorine.

Example 2

10 parts of mono-aminoviolanthrone cf. Colour Index No. 1102, and U. S. A. Patents 796,393 and 876,679 in finest state of subdivision are introduced into 700 parts of sulfuric acid of 10 per cent. strength. The suspension is then heated at 95° C. and there are added by and by at this temperature 300 parts of an aqueous solution containing 20 parts of sodium chlorate. The same temperature is maintained still for some hours and the dyestuff filtered, washed and dried. It forms a black powder, dissolving in sulfuric acid with bluish-red, in boiling nitrobenzene with greenish-blue coloration. The dyestuff yields a blue vat, dyeing cotton black tints which are fast to chlorine. If aminodimethylviolanthrone (cf. for instance Annalen der Chemie 394 page 147) is used instead of aminoviolanthrone, an analogous dyestuff is obtained.

Example 3

10 parts of mono-aminoviolanthrone cf. Colour Index No. 1102, and U. S. A. Patents 796,393 and 876,679 in finest state of subdivision are suspended in 100 parts of nitrobenzene and the suspension is heated at about 95° C. Through the mixture there are passed in a slow current, while stirring, and at about 95-100° C., 8 parts of nitrosyl chloride. The color of the suspension of the dyestuff changes from green to black. After cooling the mixture of reaction is filtered, washed with a small quantity of nitrobenzene, then with alcohol, and finally thoroughly with boiling water. The dyestuff, when in a dry state, dissolves in boiling nitrobenzene with bright blue coloration and brownish-red fluorescence, in boiling xylene with slightly violet coloration and brownish-red fluorescence, and in boiling aniline with blue coloration. In concentrated sulfuric acid the dyestuff dissolves with bluish-red coloration. When poured into water there separate from this solution dark blue flocks. The dyestuff dyes cotton from a blue vat reddish-black tints which are fast to chlorine.

*Example 4*

10 parts of pure mono-aminoviolanthrone cf. Colour Index No. 1102, and U. S. A. Patents 796,393 and 876,679 in finest state of subdivision are suspended in 500 parts of water, the suspension is treated with 100 parts of pure hydrochloric acid and 85 parts of an aqueous solution containing 14 parts of sodium nitrite, are introduced by and by while stirring, beneath the surface of the mixture. The whole is further stirred for some hours at ordinary temperature, air is blown through the mixture and the dyestuff filtered and washed thoroughly with boiling water. The new dyestuff dissolves in concentrated sulfuric acid with bluish-violet coloration; when poured into water there separate from this solution dark blue flocks. The dyestuff dissolves in boiling nitrobenzene with blue coloration and brownish-red fluorescence, in boiling xylene with violet coloration and brownish-red fluorescence, in boiling aniline with blue coloration. It yields a bright blue vat, dyeing cotton directly reddish-black tints.

What I claim is:

1. A process for the production of vat dyestuffs by treating a mono-aminoviolanthrone, the nuclear structure of which corresponds with the formula

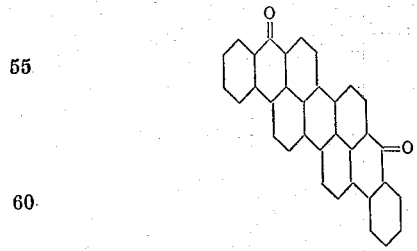

in liquid suspension with such oxidizing agents which may be employed in an acid medium.

2. A process for the production of vat dyestuffs by treating the mono-aminoviolanthrone which is obtained by nitration and reduction of the violanthrone of the formula

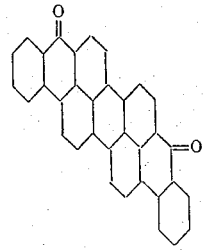

in aqueous suspension with such oxidizing agents which may be employed in an acid medium.

3. The herein described oxidation products of mono-aminoviolanthrones of the nuclear structure.

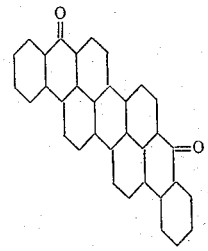

which form dark powders, dissolving in concentrated sulfuric acid to a bluish-red, in boiling nitrobenzene to blue to greenish-blue solutions, yielding a blue vat from which cotton is dyed fast olive-black to reddish-black tints which remain unchanged by treatment with chlorine.

In witness whereof I have hereunto signed my name this 8th day of July 1925.

HUGO SIEBENBÜRGER.